US011951499B2

(12) United States Patent
Vanzetto et al.

(10) Patent No.: US 11,951,499 B2
(45) Date of Patent: Apr. 9, 2024

(54) SPRAYER SUPPORT, SPRAYING DEVICE INCLUDING SUCH A SUPPORT, AND METHOD FOR MANUFACTURING SUCH A SUPPORT

(71) Applicant: EXEL INDUSTRIES, Epernay (FR)

(72) Inventors: Denis Vanzetto, Paris (FR); Sylvain Perinet, Paris (FR)

(73) Assignee: EXEL INDUSTRIES, Epernay (FR)

(*) Notice: Subject to any disclaimer, the term of this patent is extended or adjusted under 35 U.S.C. 154(b) by 342 days.

(21) Appl. No.: 17/227,367

(22) Filed: Apr. 11, 2021

(65) Prior Publication Data

US 2021/0323019 A1 Oct. 21, 2021

(30) Foreign Application Priority Data

Apr. 15, 2020 (FR) ...................................... 2003783

(51) Int. Cl.
*B05B 15/62* (2018.01)
*B05B 5/16* (2006.01)
*B05B 13/04* (2006.01)
*B33Y 80/00* (2015.01)

(52) U.S. Cl.
CPC ............ *B05B 15/62* (2018.02); *B05B 5/1608* (2013.01); *B05B 13/0431* (2013.01); *B33Y 80/00* (2014.12)

(58) Field of Classification Search
CPC . B05B 15/62; B05B 13/0278; B05B 13/0431; B05B 5/1608
See application file for complete search history.

(56) References Cited

U.S. PATENT DOCUMENTS

| 4,520,949 A * | 6/1985 | Seitz | B05B 5/04 220/4.21 |
| 4,555,058 A * | 11/1985 | Weinstein | B05B 5/0415 239/296 |
| 5,853,126 A * | 12/1998 | Alexander | B05B 5/0422 239/700 |
| 7,703,700 B2 * | 4/2010 | Yasuda | B05B 5/0415 239/128 |
| 2009/0078801 A1* | 3/2009 | Takahashi | B05B 5/0407 239/700 |
| 2017/0217024 A1* | 8/2017 | Sotzny | B05B 13/0431 |
| 2019/0231018 A1* | 8/2019 | Boutin | A42B 3/124 |

FOREIGN PATENT DOCUMENTS

| CN | 108372057 A | 8/2018 |
| FR | 2644322 A1 | 9/1990 |

OTHER PUBLICATIONS

INPI Rapport de Recherche Préliminaire for Patent Application No. FR 2003783, Dec. 1, 2020, 2 pp.
EPO Patent Translation for CN108372057A, Apr. 1, 2021, 8 pp.

* cited by examiner

*Primary Examiner* — Cody J Lieuwen
(74) *Attorney, Agent, or Firm* — Soquel Group LLC

(57) ABSTRACT

A sprayer support including a housing for a high-voltage unit or plug, a guiding member for at least one coating product hose, a retention member for air hoses, a first fastening member for fastening to a robot, and a second fastening member for fastening to a sprayer. The housing, the guiding member, the retention member, the first fastening member, and the second fastening member are formed from a single part.

14 Claims, 4 Drawing Sheets

SPRAYER SUPPORT, SPRAYING DEVICE INCLUDING SUCH A SUPPORT, AND METHOD FOR MANUFACTURING SUCH A SUPPORT

CROSS-REFERENCE TO RELATED APPLICATION

This application claims priority of French Patent Application No. 20 03783, filed on Apr. 15, 2020.

FIELD OF THE INVENTION

The present invention relates to a sprayer support, as well as a spraying device including such a support and a method for manufacturing such a support.

BACKGROUND OF THE INVENTION

It is known to fasten a sprayer to a robot within a spraying system using a support. That support is usually formed by an assembly of machined parts. Each of these parts has a different function. The support must make it possible to link the sprayer and the robot. Additionally, it must enable the guiding of fluid hoses, the guiding and securing of air hoses, and support a high-voltage unit.

The manufacturing and joining of diverse parts entail a significant cost, as well as a relatively long, complex assembly process.

SUMMARY OF THE DESCRIPTION

It is this drawback that the invention intends to remedy, by proposing a sprayer support that is inexpensive and easy to assemble.

To that end, the invention relates to a sprayer support including a housing for a high-voltage unit or high-voltage plug, a guiding member for at least one coating product hose, a retention member for air hoses, a first fastening member for fastening to a robot, and a second fastening member for fastening to a sprayer. According to the invention, the housing, the guiding member, the retention member, the first fastening member, and the second fastening member are formed from a single part.

Owing to the invention, the manufacturing of the support from a single part makes it possible to reduce manufacturing costs and facilitate the assembly of the part with a robot and a sprayer.

According to advantageous but not mandatory features of the invention, such a support may include one or more of the following features, taken in any technically possible combination:
- The support is fashioned using an additive manufacturing method.
- The support is manufactured from a synthetic material, preferably polyamide 12, polyoxymethylene, polyetheretherketone, or polyethylene terephthalate.
- The support further includes a housing for a low-voltage unit, also formed of the same part as the rest of the support.
- The first fastening member, the retention member, and the second fastening member are aligned in that order along an axis of the support.
- The housing for the high-voltage unit or plug is a cylinder aligned with the axis of the support.
- The housing for the high-voltage unit or plug is located between the first fastening member and the second fastening member, the guiding member is centered on the axis of the support, the guiding member has an inner radius with a value greater than a value of the outer radius of the housing for the high-voltage unit or plug, and preferably, the difference between the value of the inner radius of the guiding member and the value of the outer radius of the housing for the high-voltage unit is between 0.1 mm and 2 mm, and preferably on the order of 0.5 mm.
- The support includes marks for identifying the air hoses.

According to another aspect, the invention also relates to a spraying device including a sprayer, a robot, and a sprayer support, the sprayer being connected to the robot by the sprayer support. According to the invention, the sprayer support is as described above.

This device leads to the same advantages as those stated regarding the support.

According to advantageous but not mandatory features of the invention, such a device may include air hoses held in place by the retention member and at least one coating product hose guided by the guiding member.

According to yet another aspect, the invention further relates to a method for manufacturing a support as mentioned above, characterized in that it is a multi-jet fusion additive manufacturing method.

BRIEF DESCRIPTION OF THE DRAWINGS

The invention will be better understood, and other advantages thereof will become more clearly apparent, upon reading the following description of one embodiment of a sprayer support and a spraying device compliant with its principle, given only as an example and referencing the drawings, in which.

DETAILED DESCRIPTION

Figure 1:
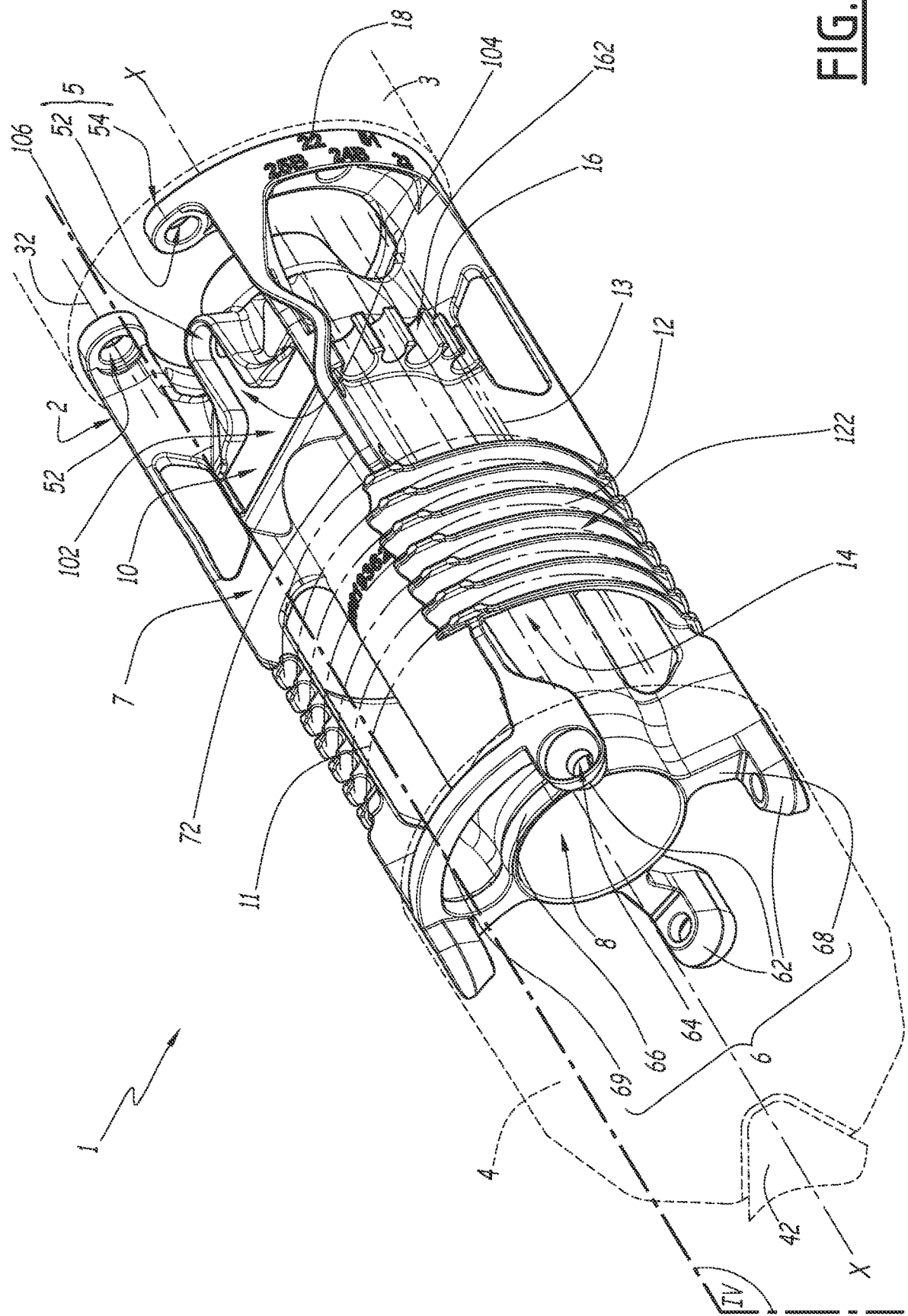
FIG. 1 is a bottom-up perspective view of a spraying device according to the invention including a sprayer support, also according to the invention.

A spraying device 1 is partially depicted in FIG. 1. Spraying device 1 includes a support 2, a robot 3, which may for instance be a reciprocating robot, as well as a sprayer 4 equipped with at least one nozzle 42 for spraying a fluid. For clarity's sake, only part of robot 3 is depicted, namely the end of one manipulation arm. Robot 3 and sprayer 4 are depicted as transparent and dotted in FIG. 1, and are not depicted in the other figures.

Support 2 defines a longitudinal axis X, on which robot 3 and sprayer 4 are aligned.

Figure 2:
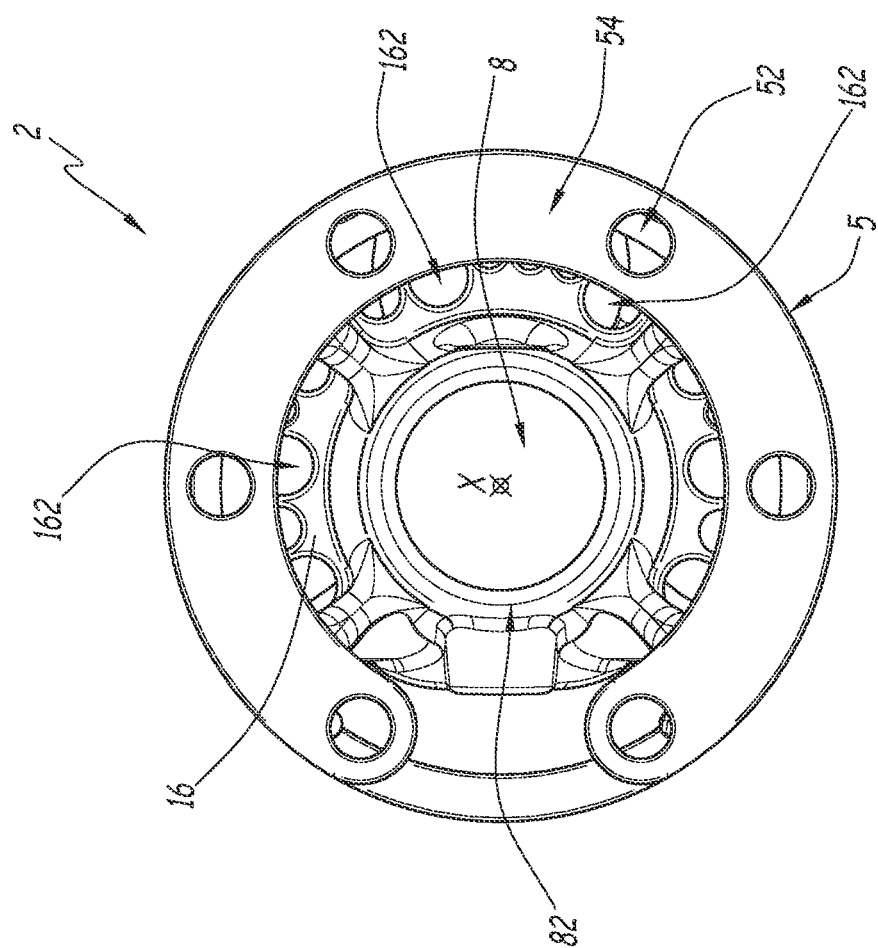
FIG. 2 is a rear view of the support of FIG. 1.

Support 2 includes, and one of its ends, referred to as the distal end, a fastening member 5 for fastening to robot 3. As is more visible in FIG. 2, fastening member 5 is horseshoe-shaped, centered on axis X, which includes boreholes 52 intended to receive screws 32 for fastening to robot 3, depicted as axis dashes in FIG. 1. In the example of the figures, fastening member 5 includes six boreholes 52. Fastening member 5 further includes a resting surface 54 intended to position support 2 onto robot 3.

At its proximal end, opposite the distal end, support 2 includes a fastening member 6 for fastening to sprayer 4. Fastening member 6 includes four feet 62, each foot having an orifice 64 for allowing through a screw to fasten sprayer 4 onto support 2. Feet 62 are connected by bridges 68 to a ring 66 centered on axis X, feet 62 being regularly distributed around a circle centered on axis X and whose diameter is greater than the diameter of ring 66. Furthermore, two of feet 62, directed toward the bottom of support 2, are connected by an arc 69 whose function is to accurately position a template not depicted in the figures. The template belongs to device 1 and maintains the fittings intended to direct the fluid and air to sprayer 4.

Members 5 and 6 of support 2 are linked by a frame 7 that forms a base of support 2. Frame 7 includes four risers 72, each riser 72 extending from one of feet 62 and reaching fastening member 5. Risers 72 are substantially rectilinear and parallel to axis X.

Thus, owing to members 5, 6, and 7, support 2 allows for a link between robot 3 and sprayer 4.

Figure 3:
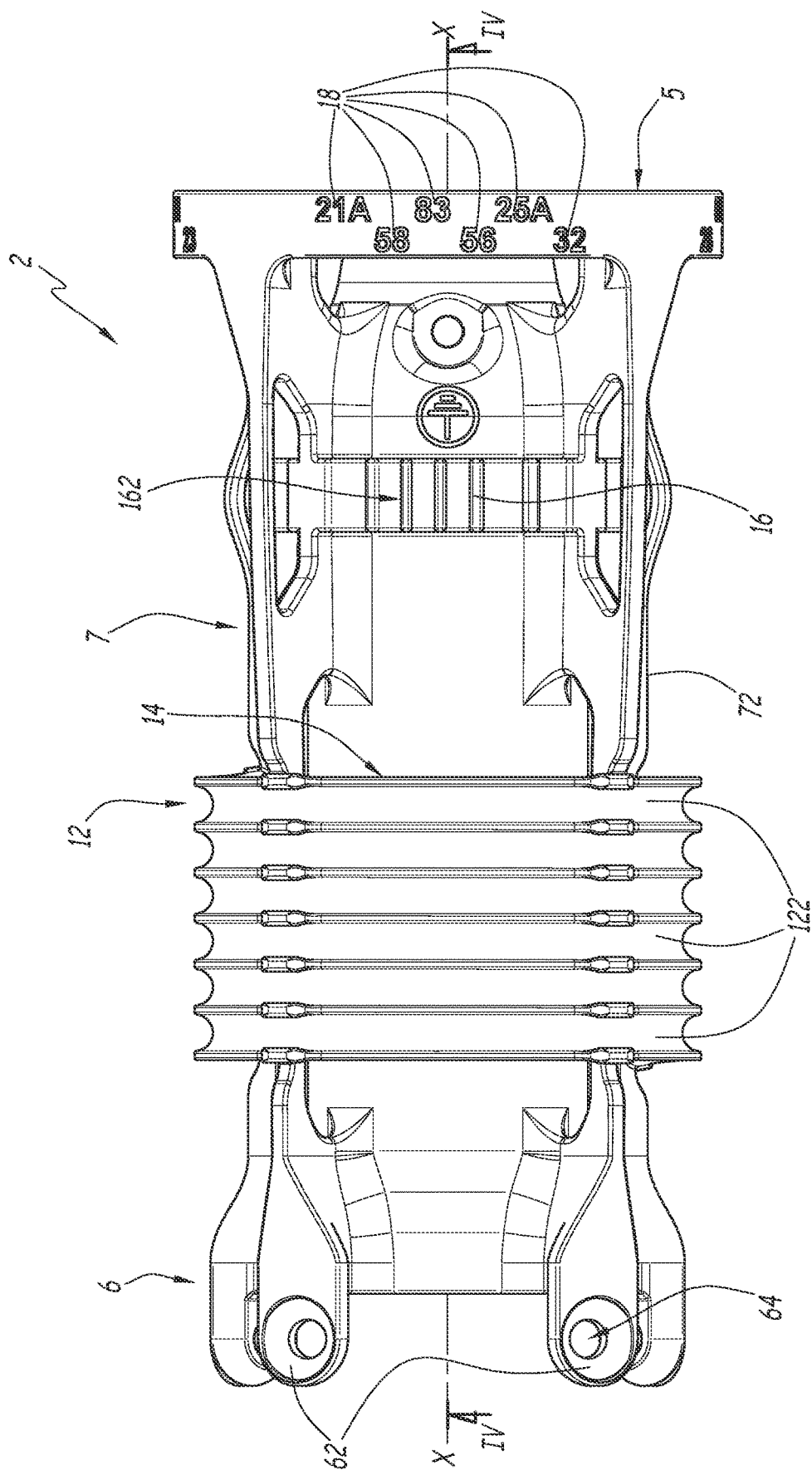
FIG. 3 is a top view of the support of FIGS. 1 and 2.
Figure 4:
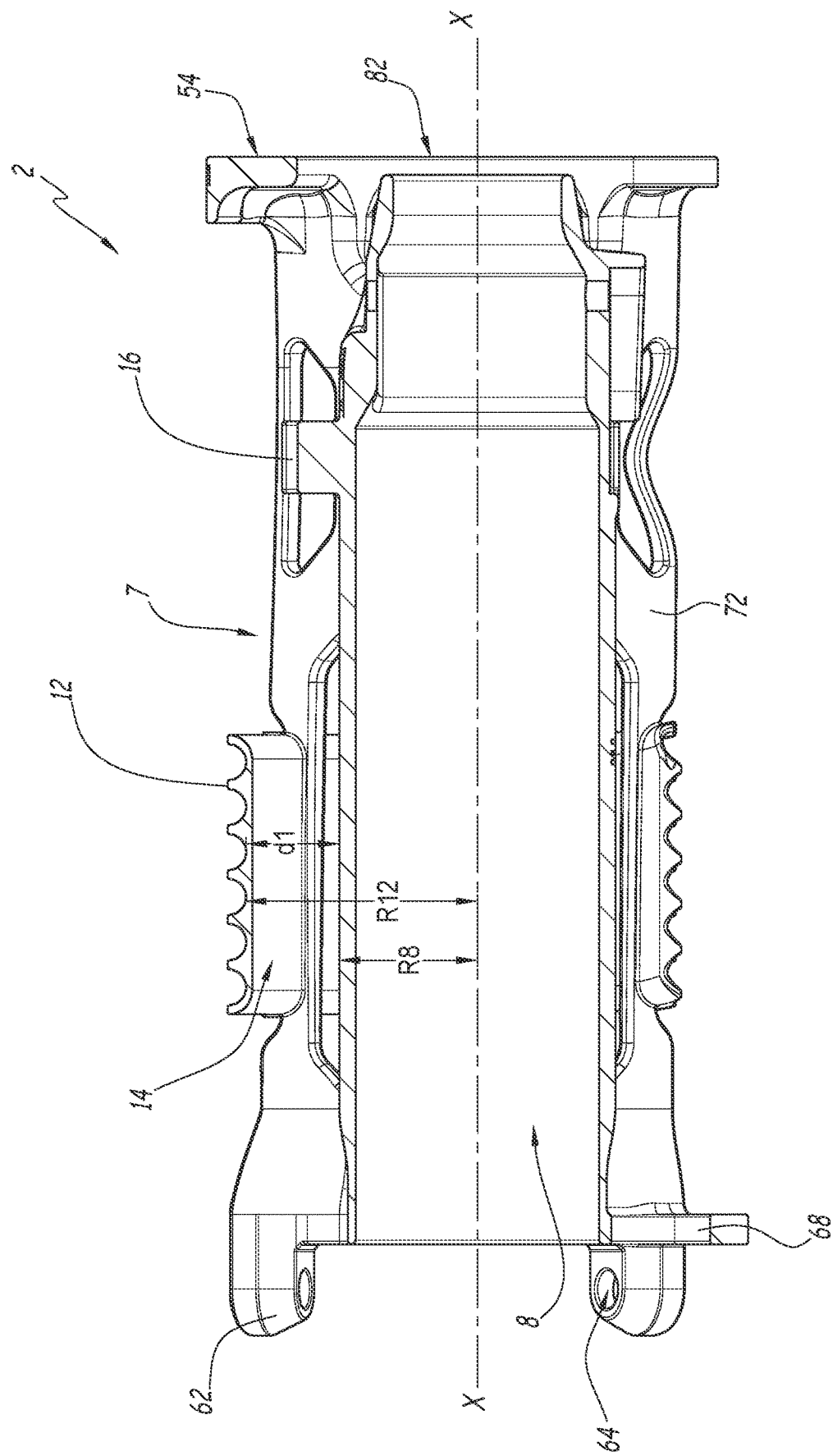
FIG. 4 is a cross-section according to plane IV of FIG. 1.

Ring 66 is extended along axis X, in the direction of fastening member 5, by a housing 8 to accommodate a high-voltage unit (not depicted). Housing 8 is a hollow cylinder, in the example one with a circular base, whereof one of the ends is formed by ring 66 and the other end 82 is in the plane of resting surface 54. Housing 8 is more visible in FIG. 3.

As is visible in FIG. 1, a housing 10 is provided for a low-voltage unit (also not depicted). Housing 10 is fastened under housing 8 and includes a space 102, orthogonal to axis X, as well as an extension 104 parallel to axis X. The space 102 and extension 104 form a single volume to accommodate the low-voltage unit, that volume being T-shaped when seen from below, in a direction radial to axis X. At the end of extension 104, a borehole 106 enables a cable to run through connecting the low-voltage unit to the high-voltage unit.

During operation, the high-voltage unit is paced in housing 8. The high-voltage unit is supplied with low-voltage current provided by the low-voltage unit. The high-voltage unit is usually composed of diodes that make it possible to raise the voltage of the current provided by the low-voltage unit. The low-voltage unit is also used to connect the assembly formed by the high-voltage unit and the low-voltage unit to a ground. To connect the high-voltage unit and the low-voltage unit, in general, the high-voltage unit is equipped with a female plug compatible with a male plug of a connector belonging to the low-voltage unit. This device, formed of the low- and high-voltage units, makes it possible to supply sprayer 4 with high-voltage current in order to charge the paint particles to be sprayed out from nozzle 42, in the context of applying an electrostatic coating product.

The coating product to be applied by means of the sprayer is directed into sprayer 4 by two hoses 11, depicted as axis dashes in FIG. 1, guided by a guiding member 12. The fluid may, for instance, be a coating product such as a paint. Guiding member 12 describes a cylindrical portion centered on axis X and partially surrounding housing 8. Guiding member 12 is open on the bottom of support 2. In practice, guiding member 12 is open on an angle of between 20° and 90° around axis X. Preferably, the angle is 65°. Guiding member 12 includes recesses 122, provided to hold hoses 11, which are preferably disposed in a staggered manner on guiding member 12. In this case, "staggered" means that the two hoses are placed in alternating fashion in recesses 122, along the length of the guiding member. In the example of the figures, guiding member 12 includes six recesses 122. Guiding of hoses 11 through recesses 122 makes it possible to electrically isolate the hoses from one another so that they do not come into contact. Such a contact could locally create an arc due to the difference in potential between two fluids each with their own resistivity, contained within the two hoses.

Since the product contained in hoses 11 is brought to high voltage near a head of sprayer 4 and grounded near robot 3, it is necessary for hoses 11 to be long enough to prevent any creeping discharge. The winding of hoses 11 around guiding member 12 makes it possible to increase the length of hoses 11 while limiting the overall form factor of support 2. The length of hoses 11 depends on the resistivity of the fluids carried by hoses 11 and on the desired voltage. For instance, for a fluid with a resistivity of 3 Mohm-cm and a voltage of 100 kV, it is necessary for hoses 11 to be 850 mm. Voltage being equal, the greater the resistivity of the fluid used, the less the length of hoses 11 is required to be.

Additionally, winding of hoses 11 around guiding member 12 makes it possible to keep the metal flakes contained in certain fluids from pointing in the direction of the electric field generated by the high-voltage unit. This avoids generating a short-circuit intrinsic to the fluid.

In practice, for the length of hoses 11 to be sufficient and for the form factor of support 2 to be optimized, guiding member 12 has an inner diameter greater than the outer diameter of housing 8. In practice, the distance dl separating housing 8 and guiding member 12 is equal to the difference between a value of inner radius R12 of guiding member 12 and a value of outer radius R8 of housing 8. Distance dl is between 0.1 mm and 2 mm. Preferably, distance dl is 0.5 mm. Thus, a space 14 of radial thickness dl is formed between guiding member 12 and housing 8. Space 14 is used to run air hoses 13 of robot 3 to sprayer 4. Air hoses 13, depicted as axis dashes in FIG. 1, are used to supply an air envelope to shape the jet of coating product coming out from nozzle 42 of sprayer 4, to supply air valves of sprayer 4, and potentially, to supply and/or slow the turbine of sprayer 4.

In order to hold air hoses 13 in place, a retention member 16 is disposed on the exterior of housing 8, between fastening member 5 and guiding member 12. Retention member 16 describes a portion of a circle around housing 8. That portion of a circle is bounded by housing 10 and includes a housing 162 for each air hose 13. In the example of the figures, the guiding member includes fifteen housings 162 distributed around axis X to accommodate fifteen air hoses, only some of those housings being visible in FIGS. 1-3.

In practice, the number of housings 162 is not necessarily equal to fifteen. For instance, retention member 16 may include up to twenty-five housings 162 or, conversely, fewer than ten such housings. In order to identify air hoses 13, identification marks 18 are etched onto the exterior of fastening member 5. Thus, hoses 13 are each fastened in a housing 162, and then extend along housing 8, while also being easy to spot. They are therefore parallel to axis X and each air hose passes through fastening member 5, under one of the identification marks 18. The shape of retention member 16 makes it possible to quickly fasten the air hoses before they are connected to sprayer 4 by snapping them onto retention member 16.

To make support 2 compact, it is fashioned using an additive manufacturing method. Thus, housings 8 and 10, fastening members 5 and 6, and support and retention members 12 and 16 are made from a single part. In other words, support 2 is manufactured from the same block of material.

Unlike an assembly of different parts, the additive manufacturing method, which may, for instance, be a multi-jet fusion (MJF) manufacturing method, makes it possible to optimize the form factor of support 2, particularly by allowing retention member 16 to be placed between guiding member 12 and fastening member 5. The multi-jet fusion manufacturing method consists of applying, for each layer of the part to be created, a binder and a detailing agent, whose function is to smooth a surface, onto a surface to be fused with a powder. Next, a liquid agent is deposited in order to fuse the desired particles. Finally, each layer of material is heated in order to form the part.

Additionally, identification marks 18 are integrated directly onto support 2 during its manufacture. There is thus no need to perform an additional operation to etch them into the part. This makes it possible to save additional time when manufacturing support 2, which therefore has a lower cost.

In order to keep the manufacturing cost low, while having good mechanical properties, support 2 is made of synthetic materials, preferably polyamide 12. This is because the combined use of additive manufacturing with polyamide 12 makes it possible to have a support 2 that is lightweight and resistant to solvents used in a coating product spraying facility.

In one variant, support 2 may be manufactured, for instance, out of polyoxymethylene, polyetheretherketone, or polyethylene terephthalate.

In another variant, fastening member 5 connecting to the sprayer includes a different number of boreholes 52, such as three or ten.

In one variant, the spraying device includes a different number of hoses 11 that bring coating product to sprayer 4, such as one or three. In general, the number of hoses 11 varies between 1 and 4. Each hose 11 may also be used to carry a rinsing product or a solvent.

In one variant, the number of feet 62 and the number of risers 72 may vary. For instance, support 2 may include five feet 62 and five risers 72, or three feet 62 and six risers 72.

In one variant, the high-voltage unit is replaced with a high-voltage plug, supplied directly with high-voltage current. In such a case, instead of the low-voltage unit, a connector makes it possible to connect the high-voltage unit to the ground.

In one variant, guiding member 12 may include a different number of recesses, such as four or eight.

The embodiment and variants mentioned above may be combined with one another to generate new embodiments of the invention.

The invention claimed is:

1. A sprayer support comprising:
   a housing for a high-voltage unit or plug;
   a guiding member for at least one coating product hose, said guiding member describing a cylindrical portion centered on a longitudinal axis of the support, the guiding member partially surrounding the housing for the high-voltage unit or plug and its cylindrical portion being provided, on its outer periphery, with staggered recesses accommodating the coating product hose in a wound configuration and electrically isolating the coating product hose;
   a retention member for air hoses, the retention member describing a portion of a circle around the housing for the high-voltage unit or plug, the portion of a circle comprising, on its outer periphery, several housings for accommodating and fastening each air hose;
   a first fastening member for fastening to a robot; and
   a second fastening member for fastening to a sprayer, wherein said housing, said guiding member, said retention member, said first fastening member, and said second fastening member are formed from a single part.

2. A sprayer support according to claim 1, manufactured from a synthetic material.

3. A sprayer support according to claim 2, wherein the synthetic material is polyamide 12, polyoxymethylene, polyetheretherketone, or polyethylene terephthalate.

4. A sprayer support according to claim 1, further comprising a housing for a low-voltage unit, which is also formed of the same part as the rest of the support.

5. A sprayer support according to claim 1, wherein said first fastening member, said retention member, and said second fastening member are aligned in that order along an axis of the support.

6. A sprayer support according to claim 1, wherein said housing for the high-voltage unit or plug is a cylinder aligned with an axis of the support.

7. A sprayer support according to claim 1, wherein said housing for the high-voltage unit or plug is located between said first fastening member and said second fastening member, wherein said guiding member is centered on an axis of the support, and wherein said guiding member has an inner radius with a value greater than a value of the outer radius of said housing for the high-voltage unit or plug.

8. A sprayer support according to claim 7, wherein a difference between the value of the inner radius of said guiding member and the value of the outer radius of said housing for the high-voltage unit is between 0.1 mm and 2 mm.

9. A sprayer support according to claim 8, wherein a difference between the value of the inner radius of said guiding member and the value of the outer radius of said housing for the high-voltage unit is approximately 0.5 mm.

10. A sprayer support according to claim 1, further comprising marks for identifying the air hoses.

11. A spraying device comprising:
    a sprayer;
    a robot; and
    a sprayer support according to claim 1, connecting said sprayer to said robot.

12. A spraying device according to claim 11, further comprising:
    air hoses held in place by the retention member of said sprayer support; and
    at least one coating product hose guided by the guiding member of said sprayer support.

13. A method for manufacturing a support according to claim 1, comprising a multi-jet fusion additive manufacturing method.

14. A sprayer support according to claim 1, wherein the guiding member includes several recesses for guiding several product hoses and for isolating them from one another.

* * * * *